PULSE DISCRIMINATION CIRCUITRY

Filed Aug. 4, 1967 3 Sheets-Sheet 1

INVENTORS.
JOHN A. HIBNER
MICHAEL I. BEHR
BY
Christie, Parker & Hale
ATTORNEYS

PULSE DISCRIMINATION CIRCUITRY

Filed Aug. 4, 1967 3 Sheets-Sheet 2

INVENTORS.
JOHN A. HIBNER
MICHAEL I. BEHR
BY Christie, Parker & Hale
ATTORNEYS

INVENTORS.
JOHN A. HIBNER
MICHAEL I. BEHR
BY
Christie, Parker & Hale
ATTORNEYS

United States Patent Office 3,559,178
Patented Jan. 26, 1971

3,559,178

PULSE DISCRIMINATION CIRCUITRY

John A. Hibner, Sierra Madre, and Michael I. Behr, South Pasadena, Calif., assignors to Burroughs Corporation, Detroit, Mich., a corporation of Michigan Filed Aug. 4, 1967, Ser. No. 658,489
Int. Cl. H03k *17/00;* H04g *9/00*
U.S. Cl. 340—172 18 Claims

ABSTRACT OF THE DISCLOSURE

In an arrangement for discriminating a pulse signal on an amplitude basis, the threshold level at which amplitude discrimination takes place is changed from one value to another depending upon the pattern of the pulse signal. In particular for NRZ data, a high threshold level is normally maintained. After a pulse is sensed at the high threshold level, a low threshold level is substituted for the high threshold level. Amplitude discrimination continues at the low threshold level as long as pulses are sensed in each data bit cell. When a gap appears in the pulse pattern, i.e. pulses fail to appear in one or more bit cells, the high threshold level is reestablished. Both asynchronous and synchronous arrangements are disclosed for determining the occurrence of a gap in the pulse pattern to reestablish the high threshold level.

BACKGROUND OF THE INVENTION

This invention relates to binary data recovery circuits and, more particularly, to an improved arrangement for discriminating data pulses on an amplitude basis.

It is common practice in the data handling art to reduce the effects of noise on pulse signals by amplitude discrimination. Base clippers and threshold detectors are commonly used to carry out amplitude discrimination. A base clipper transmits only that portion of the pulse signal that exceeds a threshold level, while transmitting a lower reference level at all other times. The threshold detector produces a binary output at one value while the pulse signal is below a threshold level and at the other value while the pulse signal is above the threshold level. Ideally, the threshold level in both devices is set above the maximum instantaneous amplitude that noise in the system attains and below the minimum peak amplitude that the data pulses attain. These ideal criteria are difficult to satisfy in practice. If the threshold level is set too low, excessive noise is transmitted along with the data pulses. In other words, an inefficient job of amplitude discrimination results, and noise may appear as data pulses in bit cells where no data pulses in fact are present. If the threshold level is set too high, some of the data pulses will have insufficient amplitude to exceed the threshold level and will be lost.

The pattern of the data pulses stored at high packing density, i.e. the presence or absence of pulses in the bit cells, may affect the instantaneous amplitude of noise and the peak amplitude of data pulses. An example of this takes place in the recovery of binary data stored on a magnetic surface such as a tape, a disc, or a drum in the form of nonreturn-to-zero (hereafter called NRZ) pulses. When the pulse pattern of NRZ pulses read from a magnetic surface consists of an isolated pulse separated by one or more bit cells from the pulses nearest to it, the peak amplitude of the pulse is relatively high. In pulse patterns having a series of pulses in successive bit cells, some intermediate pulses have relatively low peak amplitude although the first pulse in the series has a relatively high peak amplitude. Contrasting the peak pulse amplitude, the effect of the instantaneous noise amplitude is relatively large in gaps between pulses, i.e. in bit cells having no pulses, and is relatively small while a series of pulses occur in successive bit cells. The system parameters must be selected so the maximum instantaneous noise amplitude remains below the minimum peak amplitude of data pulses in order to permit satisfactory discrimination between data pulses and noise. This consideration implies a limitation upon the packing density of the data on the magnetic storage surface.

SUMMARY OF THE INVENTION

The invention contemplates amplitude discrimination at one of two threshold levels selected in response to the pattern of the pulse signal being discriminated. Preferably, the high threshold level is determined by the maximum instantaneous noise amplitude and the low threshold level is determined by the minimum peak pulse amplitude. Therefore, it is not necessary that the maximum instantaneous noise amplitude be smaller than the minimum peak pulse amplitude, assuming they occur in the course of different pulse patterns. The freedom from this restraint permits the utilization of higher packing densities for data storage on magnetic surfaces, particularly with respect to data stored as NRZ pulses.

In the recovery of NRZ pulses, the threshold level is normally set at the high value. After a data pulse is sensed while at the high threshold level, a conversion is made to the low threshold level. The low threshold level is maintained until a pulse fails to be sensed in a bit cell. The high threshold level is then reestablished.

A feature of the invention permits additional discrimination against noise for NRZ pulses. In order to maintain the low threshold level after it is established, another criterion must also be satisfied, viz., the pulses in successive bit cells must be of opposite polarity. As a result, the effects of noise riding the tail of an isolated pulse or the last pulse in a series are disregarded.

BRIEF DESCRIPTION OF THE DRAWINGS

The features of specific embodiments of the invention are illustrated in the drawings, in which:

FIG. 5 is a block schematic diagram of another pulse discrimination circuit embodying the principles of the invention.

DESCRIPTION OF SPECIFIC EMBODIMENTS

Figure 1:
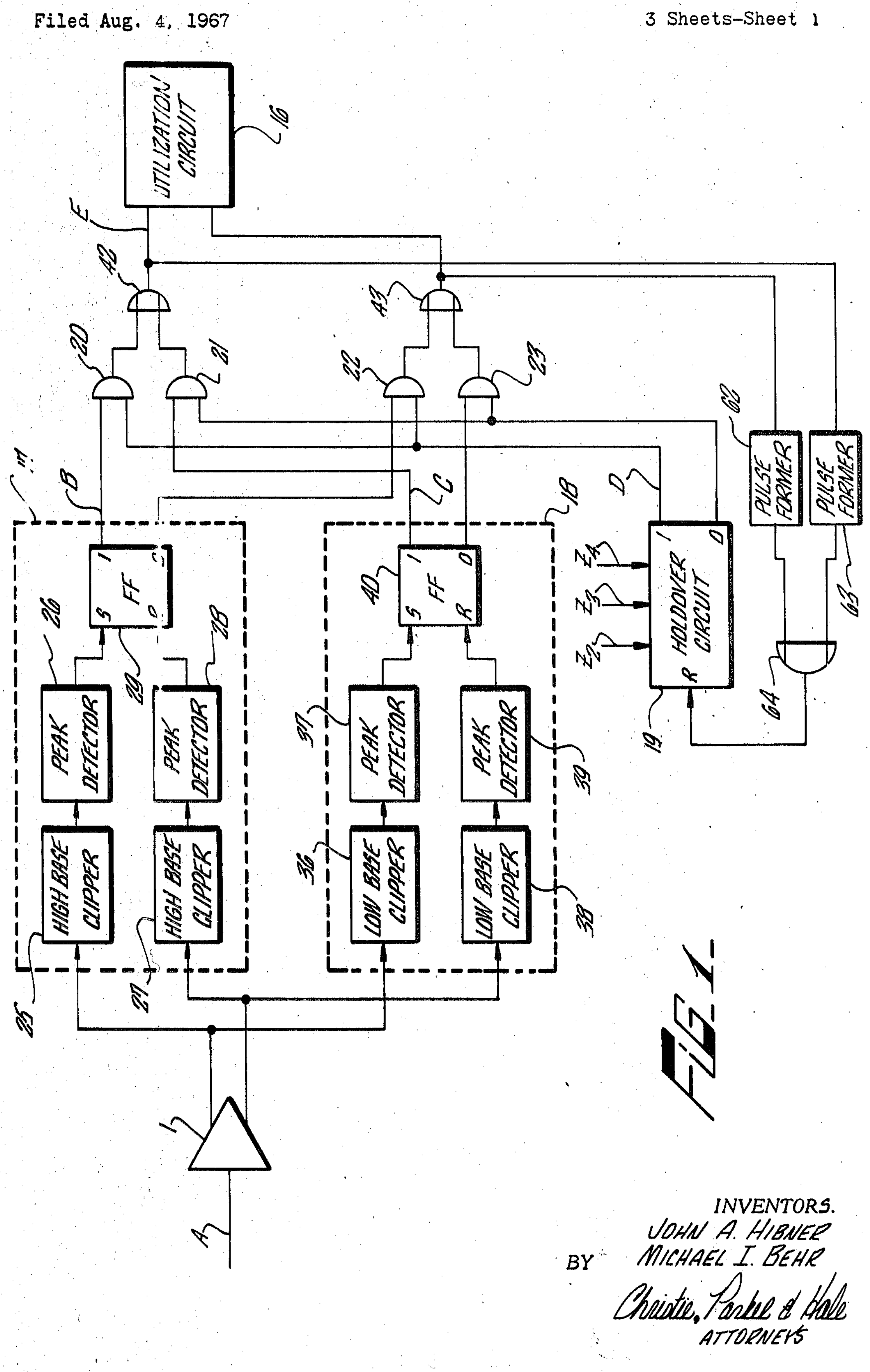
FIG. 1 is a block schematic diagram of a pulse discrimination circuit incorporating the principles of the invention.

The arrangement of FIG. 1 is suitable for the recovery of NRZ pulses stored on a magnetic surface such as a tape, a disc, or a drum. The data could be stored in conventional NRZ form in which one direction of orientation of the magnetic flux on the surface in a bit cell represents one binary value and the other direction of orientation of the magnetic flux on the surface in a bit cell represents the other binary value. The data could also be stored in modified NRZ form in which a flux reversal in either direction in a bit cell represents one binary value and the absence of a flux reversal in a bit cell represents the other binary value. In either case, the magnetic read head produces an electrical signal having a pulse at each flux reversal. The read head signal which is applied to a differential amplifier 1 in FIG. 1 is represented in FIG. 2 by wave form A.

Figure 2:
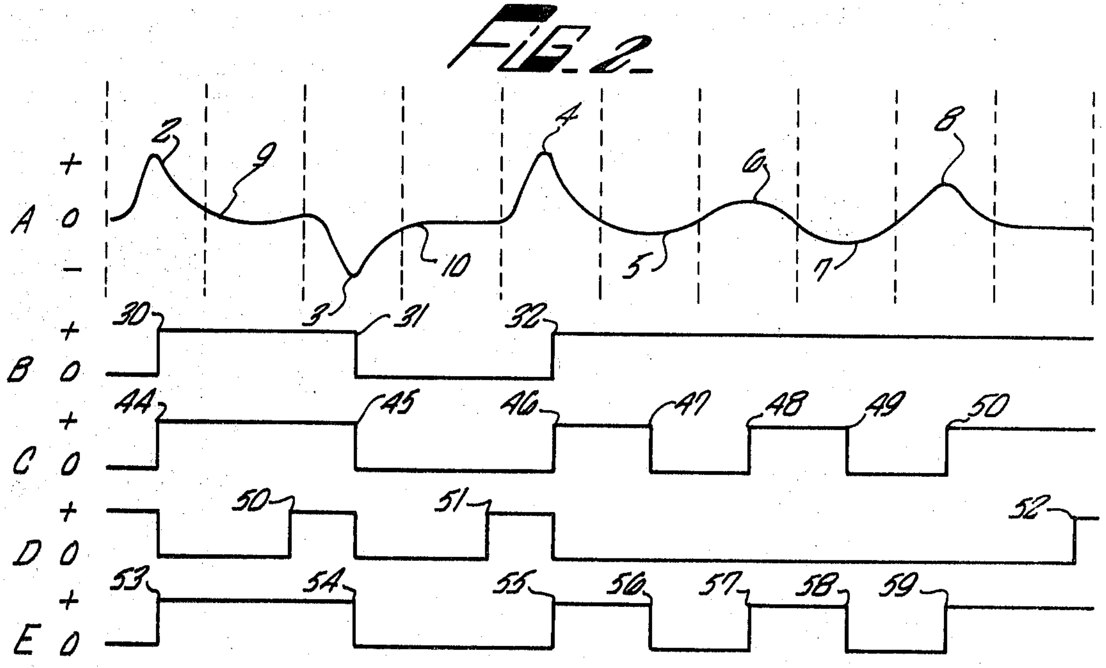
FIG. 2 depicts wave forms occurring at various points in the circuit of FIG. 1.

The bit cells are defined in wave form A of FIG. 2 by vertical dashed lines. Pulses 2 and 3 in wave form A are isolated. Pulses 4, 5, 6, 7, and 8 in wave form A occur in a series in successive bit cells. Isolated pulses 2 and 3 and pulse 4 of the serie have larger peak amplitudes than intermediate pulses 5, 6, 7, and 8. The instantaneous noise amplitude associated with the read head signal (not represented in wave form A) is larger between pulses 2 and 3 and between pulses 3 and 4 than between pulses 4 and 8 because the signal overrides the noise. As illustrated in wave form A, successive pulses are of opposite polarity which is a characteristic inherent in NRZ recording. Isolated pulses 2 and 3 tend to spread out, forming tails 9 and 10, respectively, along their trailing portions. These tails may add to noise and thereby increase the effective amplitude of the noise so it exceeds a low threshold level.

Amplifier 1 produces at its differential outputs signals that are the inverse of one another. An amplitude discrimination circuit 17 operating at a high threshold level and an amplitude discrimination circuit 18 operating at a low threshold level are connected on an alternative basis between the output of amplifier 1 and a utilization circuit 16. Under the control of a holdover circuit 19, AND circuits 20 and 22 couple discrimination circuit 17 to utilization circuit 16 and AND circuits 21 and 23 couple discrimination circuit 18 to utilization circuit 16. Discrimination circuit 17 comprises a high-level base clipper 25 in series with a peak detector 26 and a highlevel base clipper 27 in series with a peak detector 28. The output of peak detector 26 is connected to the S input of a flip-flop 29, while the output of peak detector 28 is connected to the R input of flip-flop 29. Similarly, discrimination circuit 18 comprises a low-level base clipper 36 in series with a peak detector 37 and a low-level base clipper 38 in series with a peak detector 39. The output of peak detector 37 is connected to the S input of a flip-flop 40, while the output of peak detector 39 is connected to the R input of flip-flop 40. One output of amplifier 1 is connected to the inputs of base clippers 25 and 36. The other output of amplifier 1 is connected to the inputs of base clippers 27 and 38. Base clippers 25 and 27 only transmit signal amplitudes above a predetermined high positive threshold level. Base clippers 36 and 38 only transmit signal amplitudes above a predetermined low positive threshold level. Thus, base clippers 25 and 36 respond to the positive polarity pulses of the read head signal, and base clippers 27 and 38 respond to the negative polarity pulses of the read head signal. Preferably, the threshold level of clippers 25 and 27 is above the highest noise amplitude associated with the read head signal and the threshold level of clippers 36 and 38 is lower than the smallest peak amplitude of the data pulses of the read head signal. Peak detectors 26, 28, 37, and 39 each produce trigger pulses at the peaks of the base-clipped data pulses applied to their inputs. Flip-flops 29 and 40 each have complementary outputs "1" and "0" that assume either a positive level or ground. On the application of a trigger pulse to the S input while the "0" output is at the positive level, the flip-flop becomes set, the "0" output becoming grounded and the "1" output assuming the positive level. Conversely, on the application of a trigger pulse to the R input while the "1" output is at the positive level, the flip-flop becomes reset, the "1" output becoming grounded and the "0" output assuming the positive level. Upon the application of a trigger pulse to the S input while the "1" output is at the positive level or the application of a trigger pulse to the R input while the "0" output is at the positive level, no change takes place in the state of the flip-flop. The outputs of AND circuits 20 and 21 are coupled through an OR circuit 42 to utilization circuit 16 and the outputs of AND circuits 22 and 23 are coupled through an OR circuit 43 to utilization circuit 16. The output of OR circuit 42 is connected to a pulse former 63 and the output of OR circuit 43 is connected to a pulse former 62. Pulse formers 62 and 63 could be differentiators that produce a trigger pulse at each transition of their input from ground to the positive level. Holdover circuit 19 has an R input, a "1" output normally at the positive level, and a "0" output normally at ground. The outputs of pulse formers 62 and 63 are coupled through an OR circuit 64 to the R input of holdover circuit 19. Each time that the signal at the output of OR circuit 42 or 43 experiences a transition from ground to the positive level, holdover circuit 19 is reset. As a result, its "1" output becomes grounded until holdover circuit 19 times out a predetermined time delay, after which the "1" output assumes a positive level again. If the signal at the output of OR circuit 42 or 43 experiences another transition from ground to the positive level while holdover circuit 19 is timing out its time delay, holdover circuit 19 begins to time out the time delay again from the last such transition. As a result, holdover circuit 19 remains reset with its "1" output at ground as long as the signal at the output of OR circuit 42 or 43 experiences transitions from ground to the positive level at intervals of time closer than the time delay of holdover circuit 19, which is preferably between 1.3 and 1.5 times the nominal bit cell time period. Holdover circuit 19 could be the circuit disclosed in Weber Pat. 3,132,261, issued May 5, 1964.

Assuming, for example, that the data is stored on a magnetic disc in different zones at different repetition rates, the time delay of the holdover circuit corresponds to the repetition rate of the data on one of the zones. Data is read from a different zone by energizing one of three leads designated $Z_2$, $Z_3$, and $Z_4$. This could be done by circuitry like that disclosed in FIG. 3 of a copending application of John A. Hibner, Ser. No. 584,049, entitled "Timing Arrangement for Generating Plural Phases," filed Sept. 29, 1966, and assigned to the assignee of the present application, which changes the voltage toward which a timing capacitor charges.

Circuits 17 and 18 discriminate the read head signal continuously. As illustrated in wave form B of FIG. 2, discrimination circuit 17 produces at the "1" output of flip-flop 29 a binary signal having transitions 30, 31, and 32 at the peaks of pulses 2, 3, and 4, respectively, which have sufficiently high peak amplitude to exceed the high threshold level. The peak amplitude of pulses 5, 6, 7, and 8 does not exceed the high threshold level. Due to the large noise immunity of discrimination circuit 17, it does not respond to noise occurring in the gaps between isolated pulses. Therefore, circuit 17 does not respond to these pulses. As illustrated in wave form C of FIG. 2, discrimination circuit 18 produces at the "I" output of flip-flop 40 a binary signal having transitions 44, 45, 46, 47, 48, 49, and 50 corresponding to the peaks of pulses 2, 3, 4, 5, 6, 7, and 8, respectively. In addition to responding to all of the pulses of the read head signal, circuit 18 may also respond to noise occurring in the gaps between isolated pulses because of its low threshold level. In other words, discrimination circuit 18 has a small noise immunity. The false indications of circuit 18 are not, however, transmitted to utilization circuit 16 because circuit 17 is at that time connected to utilization circuit 16. The "1" output of holdover circuit 19 is connected to AND circuits 20 and 22 with the "1" and "0" outputs, respectively, of flip-flop 29. The "0" output of holdover circuit 19 is connected to AND circuits 21 and 23 with the "1" and "0" outputs, respectively, of flip-flop 40. Holdover circuit 19 is normally set and its "1" output, represented by wave form D in FIG. 2, is normally at a positive level so AND circuits 20 and 22 connect the outputs of flip-flop 29 to utilization circuit 16. In this case, the read head signal is discriminated at a high threshold level. Upon the occurrence of a transition of the signal at the output of OR circuit 42 or 43 from ground to the positive level, which signifies that a pulse has been sensed at a high threshold level, holdover circuit 19 is reset and its "0" output assumes a positive potential. Then the outputs of flip-flop 40 are connected by AND circuits 21 and 23 to utilization circuit 16. In this case, the read head signal is discriminated at a low threshold level.

If the pulse is isolated, i.e., it is not followed by a pulse in the next succeeding bit cell, as is the case with pulses 2 and 3 in wave form A of FIG. 2, holdover circuit 19 times out its predetermined time delay. Then holdover circuit 19 becomes set again, as indicated at 50 and 51 in wave form D of FIG. 2, and remains set until the occurrence of another transition of the signal at the output of OR circuit 42 or 43 from ground to the positive level, whereupon it is reset again.

If the pulse is the first of a series of pulses in successive bit cells, as is the case with pulses 4, 5, 6, 7, and 8 in wave form A of FIG. 2, holdover circuit 19 starts to time out anew each time a pulse occurs and thus remains reset until the last of the series of pulses, plus the holdover time delay, takes place. This is illustrated at 52 in wave form D in FIG. 2.

In summary, the output of OR circuit 42, as represented by wave form E of FIG. 2, produces a binary signal having transitions 53, 54, 55, 56, 57, 58, and 59 corresponding to the peaks of pulses 2, 3, 4, 5, 6, 7, and 8 respectively. Transitions 53, 54, and 55 are formed while discriminating the read head signal on an amplitude basis at a high threshold level and transitions 56, 57, 58, and 59 are formed while discriminating the read head signal on an amplitude basis at a low threshold level. The state of the output of OR circuit 42 and the state of the complementary output of OR circuit 43 represent the data of the read head signal discriminated on an amplitude basis at different threshold levels, depending on the pulse pattern.

Since the state of flip-flops 29 and 40 can only be changed by applying a trigger pulse to the opposite input (S or R) from the input to which the previous trigger pulse was applied, flip-flops 29 and 40 will only respond to successive pulses of the read head signal of opposite polarity. This discourages the addition of noise to the tails of the isolated data pulses such as those designated 9 and 10 in wave forms A of FIG. 2 to indicate falsely a data pulse after the low threshold level has been established. As a result, the noise immunity of the circuit is greatly enhanced.

Figure 4:
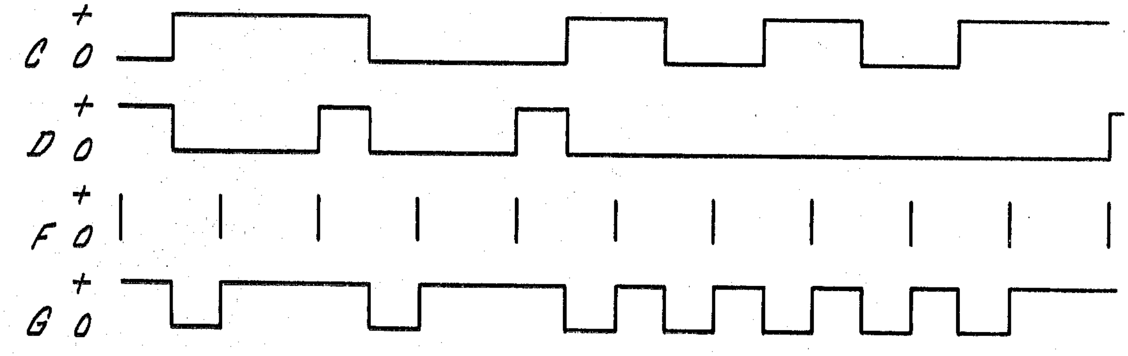
FIG. 4 depicts wave forms occurring at the various points in the circuit of FIG. 3.
Figure 3:
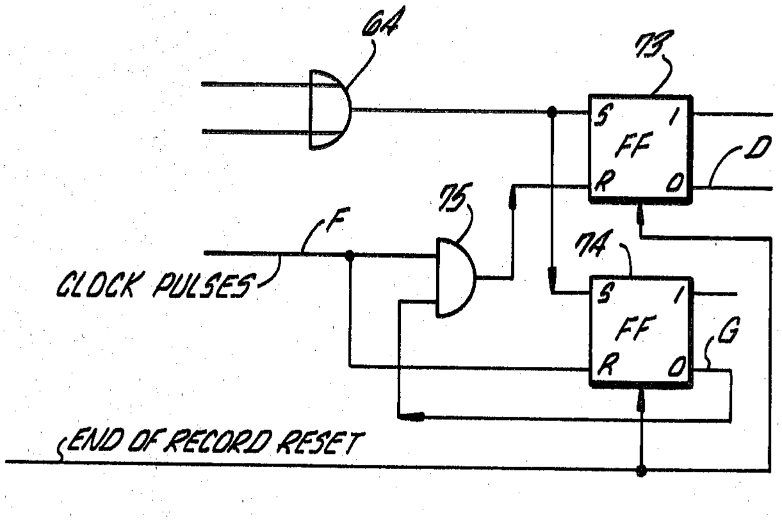
FIG. 3 is a block schematic diagram of an alternative arrangement for controlling the operative threshold level in the circuit of FIG. 1.
Figure 3:
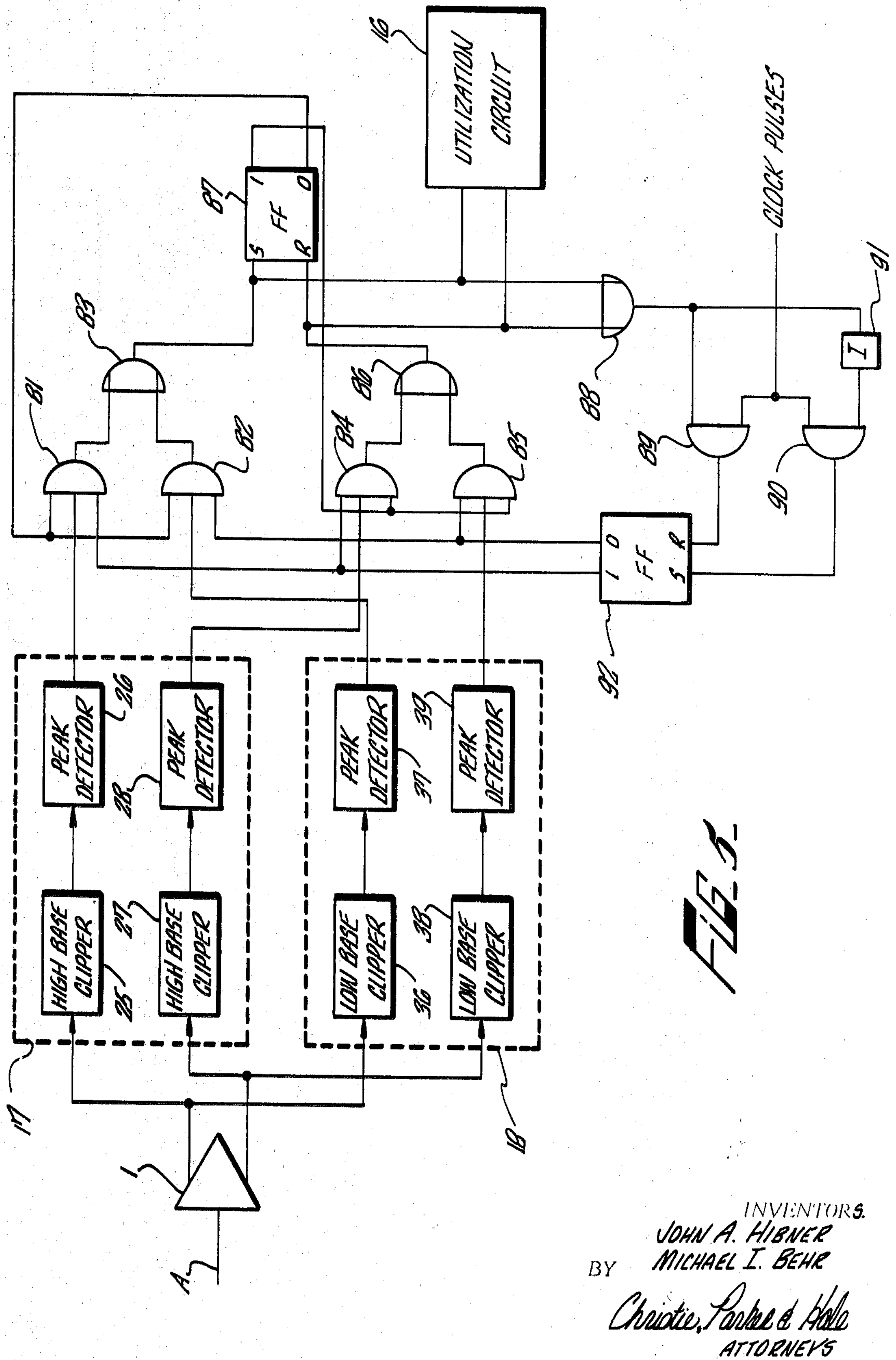

Holdover circuit 19 in FIG. 1 controls the threshold level asynchronously. In FIG. 3, an arrangement is shown for regulating the threshold level synchronously under the control of clock pulses occurring at the bit rate. These clock pulses measure the predetermined time corresponding to the holdover time delay in FIG. 1. The arrangement of FIG. 3 is substituted for holdover circuit 19 in FIG. 1. The output of OR circuit 64 in FIG. 1 is coupled to the S input of a flip-flop 73 and the S input of a flip-flop 74. The "1" output of flip-flop 73 is connected to AND circuits 21 and 23 in FIG. 1 and the "0" output of flip-flop 73 is connected to AND circuits 20 and 22 in FIG. 1. Wave form D in FIG. 4 represents the signal produced by the "0" output of flip-flop 73. Clock pulses, which are represented by wave form F in FIG. 4 are applied to one input of an AND circuit 75 and directly to the R input of flip-flop 74. The "0" output of flip-flop 74, whose signal is represented by wave form G in FIG. 4, is also connected to one input of AND circuit 75. As illustrated in wave forms C, D, and G of FIG. 4, each time a read head pulse is sensed, flip-flops 73 and 74 are set and each time that the following clock pulse occurs, flip-flop 74 is reset. The clock pulses, which could be derived from a clock track on the storage medium, are one-half of a bit cell period out of phase with the data pulses. Any time an isolated data pulse appears, thereby setting flip-flops 73 and 74, the first clock pulse following the isolated data pulse resets flip-flop 74 and thereby enables AND circuit 75. The second clock pulse following the isolated data pulse then is transmitted through AND circuit 75 and resets flip-flop 73 to reestablish the high threshold level. When a series of data pulses occurs, the first pulse in the series sets flip-flops 73 and 74. Thereafter, flip-flop 74 is repeatedly reset by a clock pulse and set by the following data pulse until the end of the series, at which time the clock pulse is gated through AND circuit 75 to reset flip-flop 73. Each time an end of record signal is sensed by the magnetic read head, flip-flops 73 and 74 are again reset.

In FIG. 5, a pulse discrimination circuit employing the principles of the invention is shown which is particularly well suited for use in a self-timed system. By a self-timed system, a system is meant in which clock pulses are derived from the recovered data as distinguished from clock pulses recorded in a special clock track on the storage medium. As in the case of the pulse discrimination circuit of FIG. 1, the read head signal is applied to differential amplifier 1. High-level discrimination circuit 17, which comprises base clippers 25 and 27 and peak detectors 26 and 28, and low-level discrimination circuit 18, which comprises base clippers 36 and 38 and peak detectors 37 and 39, are made operative on an alternative basis under the control of a flip-flop 92. One differential output of amplifier 1 is coupled to high-level base clipper 25 in series with peak detector 26 and low-level base clipper 36 in series with peak detector 37, while the other differential output is connected to high-level base clipper 27 in series with peak detector 28 and low-level base clipper 38 in series with peak detector 39. Peak detectors 26 and 37 are coupled through AND circuits 81 and 82, respectively, and an OR circuit 83 to the S input of a flip-flop 87. Similarly, peak detectors 28 and 39 are coupled through AND circuits 84 and 85, respectively, and an OR circuit 86 to the R input of flip-flop 87. The outputs of OR circuits 83 and 86 transmit the amplitude discriminated data to utilization circuit 16.

Flip-flop 87 serves to insure that successive pulses transmitted from discrimination circuits 17 and 18 to utilization circuit 16 represent opposite polarity pulses of the read head signal, thereby enhancing the noise immunity. When a pulse is applied to the R input of flip-flop 87, designating a read head pulse of negative polarity, the "0" output of flip-flop 87, which is coupled to the inputs of AND circuits 81 and 82, is energized. Thus, AND circuits 81 and 82 are prepared to transmit a pulse representing a read head pulse of positive polarity. When a pulse is applied to the S input of flip-flop 87, the "1" output of flip-flop 87, which is coupled to the inputs of AND circuits 84 and 85, is energized. Thus, AND circuits 84 and 85 are prepared to transmit a pulse representing a read head pulse of negative polarity.

Flip-flop 92 controls the selection of one of discrimination circuits 17 or 18. When the "0" output is energized, AND circuit 82 or 85 is enabled (depending on the state of flip-flop 87) and discrimination circuit 18 is operative. When the "1" output is energized, AND circuit 81 or 84 is enabled (depending on the state of flip-flop 87) and discrimination circuit 17 is operative. The outputs of OR circuits 83 and 86 are coupled to an OR circuit 88 and from there through an inverter 91 to an AND circuit 90 and directly to an AND circuit 89. Clock pulses, preferably generated from the data by means of well-known, self-timing techniques, are coupled to the other inputs of AND circuits 89 and 90. The outputs of AND circuits 89 and 90 are coupled to the R and S inputs, respectively, of flip-flop 92. Whenever a data pulse is transmitted to utilization circuit 16 during a bit cell, a clock pulse is gated through AND circuit 89 to the R input of flip-flop 92. Thus, the "0" output of flip-flop 92 becomes energized and discrimination circuit 18 becomes operative. Whenever a pulse fails to be transmitted to utilization circuit 16 during a bit cell, a clock pulse is gated through AND circuit 90 to the S input of flip-flop 92. In this case, the "1" output of flip-flop 92 becomes energized and discrimination circuit 17 becomes operative.

What is claimed is:

1. A pulse discrimination system comprising:
a source of pulse signals representing data;
means for discriminating the pulse signals on an amplitude basis at a threshold level of a first value;
a utilization circuit;
means for coupling the amplitude discriminated signal to the utilization circuit; and
means responsive to the pulse pattern of the signals for changing the threshold level to a second value upon the occurrence of a pulse larger than the first value and for maintaining the threshold level at the second value until an amplitude discriminated pulse fails to be followed by a subsequent pulse larger than the second value within a predetermined time.

2. The pulse discrimination system of claim 1, in which the means responsive to the pulse pattern of the signals maintains the threshold level at the second value until an amplitude discriminated pulse fails to be followed by a subsequent pulse of opposite polarity and larger than the second value within the predetermined time.

3. The pulse discrimination system of claim 2, in which the first value is larger than the second value, the pulse signals from the source represent data recorded on a magnetic surface by the presence and absence of pulses in bit cells, and the predetermined time is between 1.0 and 1.5 bit cell periods.

4. The pulse discrimination system of claim 1, in which the pulse signals from the source represent data by the presence and absence of pulses from bit cells, and the predetermined time is between 1.0 and 1.5 bit cell periods.

5. The pulse discrimination system of claim 1, in which the first value is larger than the second value.

6. A pulse discrimination system comprising:
a first amplitude discriminating circuit operating at a first threshold level;
a second amplitude discriminating circuit operating at a second threshold level that is smaller than the first threshold level;
a source of pulse signals representing data stored on a magnetic surface, the pulse signals being coupled to the inputs of the amplitude discriminating circuits; and
means responsive to the pattern of the pulse signals for normally selecting the output of the first amplitude discriminating circuit, selecting the output of the second amplitude discriminating circuit each time a pulse is sensed by the first amplitude discriminating circuit, and selecting the output of the first amplitude discriminating circuit after the second amplitude discriminating circuit fails to detect a pulse within a predetermined time from its selection.

7. The pulse discrimination system of claim 6, in which the first amplitude discriminating circuit comprises a first flip-flop that is set only responsive to peaks of the pulse signal of one polarity exceeding a high threshold level and is reset only responsive to peaks of the pulse signal of the opposite polarity exceeding a high threshold level and the second amplitude discriminating circuit comprises a second flip-flop that is set only responsive to peaks of the pulse signal of one polarity exceeding a low threshold level and is reset only responsive to peaks of the pulse signal of the opposite polarity exceeding a low threshold level.

8. The pulse discrimination circuit of claim 7, in which the means for selecting the output of one of the amplitude discriminating circuits comprises:
a first gate;
a second gate;
a binary circuit having complementary outputs connected to the first gate and the second gate respectively, the output of the first flip-flop being coupled through the first gate when the binary circuit is in a first state and the output of the second flip-flop being coupled through the second gate when the binary circuit is in a second state;
means combining the outputs of the first and second gates; and
means for changing the binary circuit to the second state each time the state of the first flip-flop changes and for changing the binary circuit to the first state each time the second flip-flop fails to change state within a predetermined time duration after the binary circuit changes to the second state.

9. A pulse discrimination system comprising:
a source of pulse signals representing data by the presence and absence of pulses in bit cells;
means for amplitude discriminating the pulse signal at a high threshold level after sensing the absence of a pulse from the preceding bit cell; and
means for amplitude discriminating the pulse signal at a low threshold level after sensing the presence of a pulse in the preceding bit cell.

10. The pulse discrimination circuit of claim 9, in which the source of pulse signals comprises a magnetic storage surface on which data is stored in a nonreturn-to-zero code as reversals in the direction of orientation of flux.

11. A pulse discrimination system comprising:
a source of pulse signals to be discriminated, some of the pulses being isolated from the other pulses and some of the pulses occurring in series depending upon the data the pulse signals represent;
means for discriminating the isolated pulses and the first pulse of each series on an amplitude basis at a high threshold level and for discriminating the other pulses of each series on an amplitude basis at a low threshold level;
a utilization circuit; and
means for coupling the discriminated pulse signals to the utilization circuit.

12. A pulse discrimination system comprising:
a source of data pulses representing data read from a magnetic surface on which such data is stored, the data pulses occurring in a pulse pattern determinative of the data represented by the pulses, some of the pulses in the pulse pattern being isolated from the other pulses and some of the pulses in the pulse pattern being in a series;
utilization means for the data represented by the pulses;
first means for sensing the presence of each isolated data pulse and the first data pulse of each series on the basis of a first criterion that has a large noise immunity;
second means for sensing the presence of the second data pulse of each series on the basis of a second criterion that has a small noise immunity, one of the sensing means sensing the presence of the remaining data pulses of each series; and
means for coupling the first and second sensing means to the utilization means.

13. The pulse discrimination system of claim 12, in which the first criterion is sensitive to a higher instantaneous amplitude than the second criterion.

14. The pulse discrimination system of claim 12, in which the first criterion is amplitude discrimination at a high threshold level and the second criterion is amplitude discrimination at a low threshold level.

15. The pulse discrimination system of claim 14, in which the coupling means normally couples pulses from the first sensing means to the utilization means and couples pulses from the second sensing means to the utilization means after a data pulse is sensed while at the high threshold level until a data pulse fails to be sensed in a bit cell at the low threshold level.

16. A pulse discrimination system comprising:

a source of pulse signals representing data recorded on a magnetic surface;

means for discriminating the pulse signals on an amplitude basis at a threshold level of a first value;

a utilization circuit;

means for coupling the amplitude discriminated signal to the utilization circuit; and means responsive to the pulse pattern of the signals for changing the threshold level to a second value that is smaller than the first value each time a pulse larger than the first value occurs after a predetermined time interval from the preceding amplitude discriminated pulse, maintaining the threshold level at the second value as long as pulses larger than the second value continue to occur within the predetermined time interval, and changing the threshold level from the second value to the first value each time a pulse larger than the second value fails to occur within the predetermined time interval from the preceding amplitude discriminated pulse.

17. The pulse discrimination system of claim 16, in which the threshold level remains at the second value as long as pulses of alternately opposite polarity and larger than the second value continue to occur within the predetermined time interval and changes from the second value to the first value each time a pulse of the opposite polarity and larger than the second value fails to occur within the predetermined time interval from the preceding amplitude discriminated pulse.

18. The pulse discrimination system of claim 17, in which the pulse signals from the source represent data by the presence and absence of pulses in bit cells and the predetermined time interval is between 1.0 and 1.5 bit cell periods.

References Cited

UNITED STATES PATENTS

| | | | |
|---|---|---|---|
| 2,970,261 | 1/1961 | Zoll | 340—172UX |
| 3,116,458 | 12/1963 | Margopoulos | 328—148X |
| 3,244,986 | 4/1966 | Rumble | 329—126X |
| 3,271,742 | 9/1966 | Rumble et al. | 329—112X |
| 3,327,230 | 6/1967 | Konian | 307—235X |
| 3,375,450 | 3/1968 | Ayres et al. | 307—235X |

FOREIGN PATENTS

| | | |
|---|---|---|
| 935,294 | 8/1963 | Great Britain. |

DONALD J. YUSKO, Primary Examiner

U.S. Cl. X.R.

328—150